July 4, 1933. P. KÖHLER 1,916,886
ABSORPTION TYPE REFRIGERATING APPARATUS
Original Filed April 20, 1931
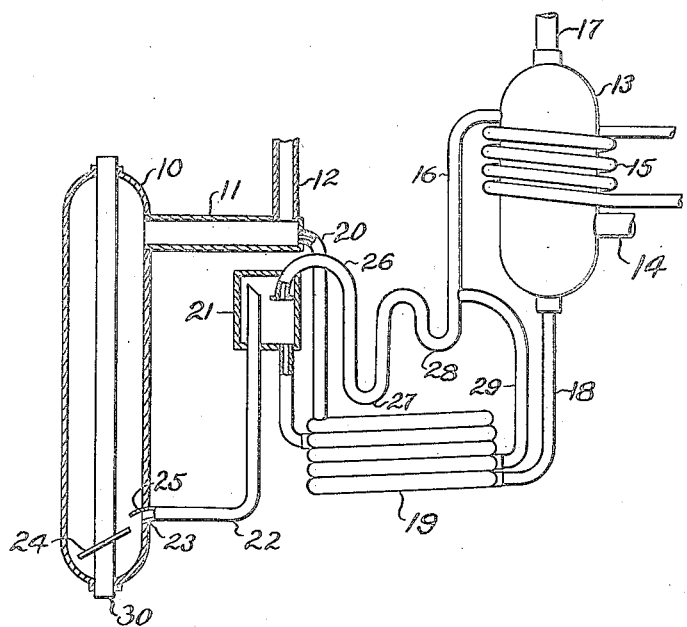
INVENTOR.
Peter Köhler
BY
ATTORNEY Patented July 4, 1933

1,916,886

UNITED STATES PATENT OFFICE

PETER KÖHLER, OF STOCKHOLM, SWEDEN, ASSIGNOR, BY MESNE ASSIGNMENTS, TO ELECTROLUX SERVEL CORPORATION, OF NEW YORK, N. Y., A CORPORATION OF DELAWARE

ABSORPTION TYPE REFRIGERATING APPARATUS

Application filed April 20, 1931, Serial No. 531,436, and in Germany August 25, 1930. Renewed July 2, 1932.

This invention relates to absorption refrigerating apparatus of the pressure equalized type, and more particularly to the circulation of absorption liquid between the generator and absorber in such apparatus.

An object of this invention is to provide an improved vapor liquid pump for raising weak absorption liquid from the generator to a level from which it flows to the absorber by gravity.

Further objects and advantages will be apparent from the following description taken in connection with the drawing in which the figure shows a generator and absorber of the well known pressure equalized type of absorption refrigerating apparatus and an arrangement contemplated by this invention for pumping weak absorption liquid from the generator to the absorber.

In the drawing, a generator 10 adapted to contain a solution of refrigerant in an absorption liquid is connected at the normal level of the liquid therein with a substantially horizontal pipe 11 which is adapted to be connected through pipe 12 to the condenser and evaporator, not shown, which are usual parts of the apparatus. As well known in the art, refrigerant gas in the evaporator vaporizes into an inert pressure equalizing gas such as hydrogen and the resulting gas mixture passes to the absorber 13 through conduit 14. In the absorber, which is cooled by some means such as water circulating coil 15, the refrigerant gas is absorbed into the weak absorption liquid entering the absorber through pipe 16 and the pressure equalizing gas returns to the evaporator through pipe 17. Enriched absorption liquid is returned from the absorber through pipe 18, heat exchanger 19 and pipe 20 into pipe 11 which is substantially a part of the generator 10.

A pump chamber comprising a fluid tight vessel 21 is located below the generator liquid level and is supplied with weak absorption liquid through pipe 22 which is connected to the lower part of the generator at 23 and extends upwardly into the pump vessel 21 terminating near the top thereof. In the bottom of the generator 10 baffle plates 24 and 25 are arranged as shown to direct gas expelled from solution in the bottom of the generator into the pipe 22. The pump vessel 21 is connected to the absorber through the pipe 16 having a goose-neck or siphon 26 which terminates within the pump vessel 15 below the opening of the pipe 22 therein. The pipe 16 is bent to form two U-bends 27 and 28 herein referred to as a W-tube. With this construction there are two rising parts of the pipe 16 and the second rising part extends upwardly above the generator liquid level and into the upper part of the absorber 13, the remainder of the tube 16 being below the generator liquid level. The first U-bend 27 is larger than the second U-bend 28 and is preferably made of sufficient length that the resistance to liquid flow therein will be equal to the liquid flow resistance of conduit 29 through the heat exchanger 19. The lower part of pump chamber 21 is connected to the absorber by pipe 29 through heat exchanger 19 and the second rising portion of the pipe 16. The connection of pipe 29 to pipe 16 is made slightly above the level of the opening of pipe 16 through goose-neck 26 into the pump vessel 21.

With the arrangement described above the liquid circulation is as follows: When the apparatus is not in operation the liquid level in the generator is at such a height that the pipe 11 is approximately half filled with liquid, the level in the absorber is at the corresponding height, and all parts of the apparatus and pipes below this level are filled with liquid. The generator is heated by any convenient means such as flue 30 and refrigerant gas is expelled from solution, that part of the gas expelled below the baffle plate 24 being directed into the pipe 22 and upwardly into the upper part of pump vessel 21 where it accumulates. Liquid fills all pipes leading from the pump vessel and therefore a pressure builds up which forces back the liquid in pipes 22, 16 and 29. Due to the liquid being forced through pipes 16 and 29, liquid is raised through pipe 16 into the absorber 13 where it flows downwardly absorbing refrigerant gas entering from the evaporator through conduit 14 and the enriched absorption liquid returns through pipe 18, heat exchanger 19, pipe 20, and pipe 11 into the generator 10.

The pressure increases in pump vessel 21 until the liquid has been forced through the W-pipe 16 to the lowest part of the second U-bend 28, when the liquid in the second rising part of pipe 16 leading to the absorber is expelled into the latter relieving the gas pressure in pump vessel 21. Since the gas pressures in the system are again equalized, weak absorption liquid flows under the liquid pressure in the generator through pipe 22 into the pump vessel 21. As the liquid level in pump vessel 21 reaches the opening of pipe 16 through which gas is flowing to the absorber, the gas connection between the pump vessel and the absorber is closed and the gas bubbles coming from the generator through the pipe 22 again accumulate in the upper part of pump vessel 21. As the pressure of the accumulated gas increases, a volume of liquid equal to the product of the surface area of the liquid in pump chamber 21 and the difference between the liquid level at which the opening of pipe 16 is closed off and the level at which the adhesion of the liquid at the opening is overcome, that is, its liquid seal broken, is siphoned through goose-neck 26 into the pipe 16. Because the liquid siphoned over into the pipe 16 must rise twice in the W-tube, the advance of this liquid to the opening of pipe 29 is delayed, and since the liquid flow resistance of the first U-bend 27 in the pipe 16 has been made to correspond to the liquid flow resistance through the heat exchanger 19, liquid is forced through the pipe 29 by the rising pressure in the pump vessel 21 to the pipe 16 closing the U-bend 28 and rising in pipe 16 thus effectively closing the liquid valve from both ends. As the valve is closed the pressure in the pump vessel 21 forces liquid through pipe 29 and pipe 16 into the absorber until the valve is again opened as previously described, when pressure equalization occurs and the cycle is repeated.

The connection of pipe 29 to the pipe 16 is made just sufficiently higher than the siphon connection of pipe 16 to the pump vessel 21 that the height of the liquid in the pipe 29 is near the former connection when pipe 16 is sealed by liquid from the pump vessel.

To insure a quick starting with this arrangement, the upper part of pump vessel 21 may be located in heat exchange relation with the pipe 11 which prevents condensation of the gas flowing into the upper part of pump vessel 21 from the generator through pipe 22, which would delay the rise in gas pressure in the pump chamber.

It will be obvious to those skilled in the art that various other changes may be made in the construction and arrangement without departing from the spirit of the invention and therefore the invention is not limited to what is shown in the drawing and described in the specification, but only as indicated in the appended claims.

I claim:

1. In absorption refrigerating apparatus of the pressure equalized type, means for circulating absorption liquid between the generator and absorber comprising a fluid tight vessel located below the generator liquid level, a pipe connected below the liquid level to the generator and extending into said vessel terminating near the top thereof, a valve pipe connected at one end to the absorber and terminating at its other end in a siphon which extends into said vessel below the opening of the first said pipe, said valve pipe being formed with two U-bends below the generator liquid level, and a pipe connecting the lower part of said vessel to the rising part of said valve pipe adjacent the absorber at a level above the opening of said siphon in said vessel.

2. In absorption refrigerating apparatus of the pressure equalized type, means for circulating absorption liquid between the generator and absorber comprising a fluid tight vessel located below the generator liquid level, a pipe connected below the liquid level to the generator and extending into said vessel terminating near the top thereof, gas collecting means in said generator associated with the end of said pipe connected to the generator, a valve pipe connected at one end to the absorber and terminating at its other end in a siphon which extends into said vessel below the opening of the first said pipe, said valve pipe being formed with two U-bends below the generator liquid level, and a pipe connecting the lower part of said vessel to the rising part of said valve pipe adjacent the absorber at a level above the opening of said siphon in said vessel.

3. In absorption refrigerating apparatus of the pressure equalized type, means for circulating absorption liquid between the generator and absorber comprising a fluid tight vessel located below the generator liquid level, a pipe connected below the liquid level to the generator and extending into said vessel terminating near the top thereof, a baffle in the lower part of the generator for directing gas expelled from solution into the end of said pipe connected to the generator, a valve pipe connected at one end to the absorber and terminating at its other end in a siphon which extends into said vessel below the opening of the first said pipe, said valve pipe being formed with two U-bends below the generator liquid level, and a pipe connecting the lower part of said vessel to the rising part of said valve pipe adjacent the absorber at a level above the opening of said siphon in said vessel.

4. In absorption refrigerating apparatus of the pressure equalized type means for circulating absorption liquid between the generator and absorber comprising a vapor liquid pump located below the generator liquid level, a pipe for conducting both absorption liquid and vapor bubbles from the generator to said vapor liquid pump, a valve pipe connected at one end to the absorber and terminating at its other end in a siphon which opens within said pump below the opening of first said pipe, said valve pipe being formed with two U-bends below the generator liquid level, and a pipe connecting the lower part of said pump to the part of said valve pipe adjacent the absorber at a level above the opening of said siphon in said pump.

5. In absorption refrigerating apparatus of the pressure equalized type means for circulating absorption liquid between the generator and absorber comprising a vapor liquid pump located below the generator liquid level, a pipe for conducting both absorption liquid and vapor bubbles from the generator to said vapor liquid pump, a valve pipe connected at one end to the absorber and terminating at its other end in a siphon which opens within said pump below the opening of first said pipe, said valve pipe being formed with two U-bends below the generator liquid level, the U-bend adjacent the pump being longer than the second U-bend, and a pipe connecting the lower part of said pump to the part of said valve pipe adjacent the absorber at a level above the opening of said siphon in said pump.

6. In absorption refrigerating apparatus of the pressure equalized type means for circulating absorption liquid between the generator and absorber comprising a vapor liquid pump located below the generator liquid level, a pipe for conducting both absorption liquid and vapor bubbles from the generator to said vapor liquid pump, a valve pipe connected at one end to the absorber and terminating at its other end in a siphon which opens within said pump below the opening of first said pipe, said valve pipe being formed with two U-bends below the generator liquid level, and a pipe connecting the lower part of said pump to the part of said valve pipe adjacent the absorber at a level above the opening of said siphon in said pump, the one of said U-bends adjacent the pump having a liquid flow resistance equal to that of the last said pipe connection.

7. In absorption refrigerating apparatus of the pressure equalized type means for circulating absorption liquid between the generator and absorber comprising a vapor liquid pump located below the generator liquid level with the upper part thereof in heat exchange relation with said generator, a pipe for conducting both absorption liquid and vapor bubbles from the generator to said vapor liquid pump, a valve pipe connected at one end to the absorber and terminating at its other end in a siphon which opens within said pump below the opening of first said pipe, said valve pipe being formed with two U-bends below the generator liquid level, and a pipe connecting said pump to the part of said valve pipe adjacent the absorber at a level above the opening of said siphon in said pump.

8. In absorption refrigerating apparatus of the pressure equalized type means for circulating absorption liquid between the generator and absorber comprising a vapor liquid pump vessel located below the generator liquid level, a pipe connected below the liquid level to the generator and extending into said vessel terminating near the top thereof, a valve pipe connected at one end to the absorber and terminating at its other end in a siphon which extends into said pump vessel below the opening of first said pipe, said valve pipe being formed with two U-bends below the generator liquid level, a pipe connecting the lower part of said pump vessel to the rising part of said valve pipe adjacent the absorber at a level above the opening of said siphon in the pump vessel and an enriched liquid return pipe from the absorber to the generator, the last two said pipes being in heat exchange relation.

9. In absorption refrigerating apparatus of the pressure equalized type means for circulating absorption liquid between the generator and absorber comprising a vapor liquid pump vessel located below the generator liquid level, a pipe connected below the liquid level to the generator and extending into said pump vessel terminating near the top thereof, baffle means in the generator for directing gas expelled from solution into the end of said pipe connected to the generator, a valve pipe connected at one end to the absorber and terminating at its other end in a siphon which extends into said pump vessel below the opening of first said pipe, said valve pipe being formed with two U-bends below the generator liquid level, a pipe connecting the lower part of said pump vessel to the rising part of said valve pipe adjacent the absorber at a level above the opening of said siphon in the pump vessel, and a liquid return pipe from the absorber to the generator, the last two said pipes being in heat exchange relation.

10. In an absorption refrigerating system of the pressure equalized type including a generator and absorber, a chamber arranged in the system to receive absorption liquid from the generator by gravity and discharge liquid into the absorber at a higher level, means for supplying vapor under pressure in said chamber, a vent from said chamber to said evaporator having two U-bends, and means for supplying liquid to said U-bends from the far ends thereof responsive to a predetermined rise in level of liquid in said chamber.

11. In an absorption refrigerating system of the pressure equalized type liquid circulating means including, a chamber arranged in the system to receive liquid by gravity and vapor under pressure, a rising discharge conduit for liquid from said chamber, a vent conduit from said chamber having two U-bends, and means for supplying liquid to said U-bends from the far ends thereof responsive to a predetermined rise in level of liquid in said chamber.

12. In a continuous refrigerating system means for circulating absorption liquid including, a chamber arranged to receive liquid under a liquid head in the system, a rising discharge conduit for liquid from said chamber, means for supplying vapor under pressure in said chamber, a vent conduit from said chamber having two U-bends, and means for supplying liquid to said U-bends from the far ends thereof to form a liquid seal responsive to a predetermined rise in level of liquid in said chamber.

13. In a continuous refrigerating system means for circulating absorption liquid including, a chamber arranged to receive liquid under a liquid head in the system, a rising discharge conduit for liquid from said chamber, means for supplying vapor under pressure in said chamber, a vent conduit from said chamber having two U-bends, the one next said chamber extending downwardly further than the other.

14. In a refrigerating apparatus of the class described, a vapor pressure liquid lift comprising a chamber supplied with vapor under pressure to force liquid therefrom to a higher level, the chamber being refilled with liquid by gravity when the pressure is decreased, means for intermittently decreasing the vapor pressure comprising a vent conduit from said chamber having two downward loops, the loop next to said chamber being the longest, and means for supplying liquid to said loops from the far ends thereof responsive to a predetermined rise in level of liquid in said chamber, the liquid seal thus formed being displaced upon a predetermined rise in pressure of vapor in said chamber.

In testimony whereof I affix my signature.

PETER KÖHLER.